United States Patent [19]

Sugio et al.

[11] Patent Number: 4,992,218

[45] Date of Patent: Feb. 12, 1991

[54] PROCESS FOR PRODUCING A POLARIZING FILM

[75] Inventors: Akitoshi Sugio, Ohmiya; Ryozo Kawai, Nagareyama; Masaki Nagata; Tamaki Kamimura, both of Tokyo, all of Japan

[73] Assignee: Mitsubishi Gas Chemical Company, Inc., Tokyo, Japan

[21] Appl. No.: 203,875

[22] Filed: Jun. 7, 1988

[30] Foreign Application Priority Data

Jun. 12, 1987 [JP] Japan .................... 62-145380

[51] Int. Cl.$^5$ .................. B29C 55/02; B29C 71/02; G02B 5/30
[52] U.S. Cl. ............................ 264/1.3; 8/489; 264/78; 427/163
[58] Field of Search ............... 264/1.3, 78; 350/398; 427/163; 8/489

[56] References Cited

U.S. PATENT DOCUMENTS

| | | | |
|---|---|---|---|
| 4,166,871 | 9/1979 | Schuler | 427/163 |
| 4,466,704 | 8/1984 | Schuler | 350/398 |
| 4,591,512 | 5/1986 | Racich et al. | 427/163 |
| 4,802,745 | 2/1989 | Okada | 350/398 |
| 4,803,014 | 2/1989 | Okumura et al. | 350/397 |

FOREIGN PATENT DOCUMENTS 59-95503 9/1984 Japan .
62-240905 4/1988 Japan .

*Primary Examiner*—James Lowe
*Attorney, Agent, or Firm*—Wenderoth, Lind & Ponack

[57] ABSTRACT

A polarizing film comprising a polyvinyl alcohol-type film and a dichroic dye, a metallic ion and boric acid incorporated therein, and a process for producing the same, which comprises adsorbing a dichroic dye on a polyvinyl alcohol-type film, stretching the film substantially in one direction, immersing the stretched film in an aqueous solution containing a metallic ion and boric acid.

10 Claims, No Drawings

PROCESS FOR PRODUCING A POLARIZING FILM

BRIEF DESCRIPTION OF INVENTION

This invention relates to a polarizing film having excellent heat resistance, moisture resistance and polarizing ability. More specifically, it relates to a process for producing a polarizing film, which comprises adsorbing a dichroic dye on a polyvinyl alcohol-type film as a base film; either (i) stretching the film and then immersing the stretched film in an aqueous solution containing a metallic ion and boric acid or (ii) immersing the film in said aqueous solution and then stretching the film; and thereafter heat-treating the film under tension; and to a polarizing film obtained by the above process.

BACKGROUND OF THE INVENTION

Polarizing films are useful, for example, as liquid crystal display elements, and have recently had an abruptly increasing demand. Polyvinyl alcohol films are widely used as base films of polarizing films. The polyvinyl alcohol-type polarizing films tend to decrease in polarizing ability under high temperature or high humidity conditions. Since, however, they are frequently used under severe conditions involving high temperatures and humidities particularly for use on vehicles, it has been desired to develop polarizing films of the polyvinyl alcohol type having excellent polarizing ability and excellent durability at high temperatures and humidities.

The following polarizing films having polyvinyl alcohol-type films as base films have previously been known.

(1) A polarizing film obtained by subjecting a polyvinyl alcohol-type film to a dehydration treatment to form a polyene, and orienting the treated film substantially in one direction.

(2) A polarizing film obtained by adsorbing iodine on a polyvinyl alcohol-type film, and then orienting the film (Japanese Laid-Open Patent Publication No. 104912/1984, Chemical Abstract, 172659S, and Japanese Laid-Open Patent Publication No. 175,602/86).

(3) A polarizing film obtained by adsorbing a dichroic dye on a polyvinyl alcohol-type film and orienting the film (Japanese Laid-Open Patent Publications Nos. 95502/1984, 95503/1984, and 18902/1986).

The polarizing films obtained by these methods have their own advantages and disadvantages.

The polarizing film (1) has inferior polarizing ability to the polarizing films (2) and (3), and lower heat resistance than the polarizing film (2).

The polarizing film (2) having iodine adsorbed thereon has excellent polarizing ability but extremely low heat resistance. Furthermore, by the method described in (2), it is difficult to adjust the color hue of the polarizing film.

The polarizing film obtained by the method described in (3) which involves dyeing with a dichroic dye has the advantage that although it has lower polarizing ability than the polarizing film (2), it has excellent heat resistance, and the color of the film can be easily adjusted. However, the polarizing film (3) has low moisture resistance, and to make up this deficiency, it has to be used while a protective film or the like is applied to it. Even then, its moisture resistance is not sufficient. When the polarizing film (3) is exposed for long periods of time to high temperature and high humidity conditions, it is reduced in optical properties and undergoes peeling and foaming, and moreover, tends to undergo "warping".

OBJECTS OF INVENTION

It is an object of this invention therefore to provide a polarizing polyvinyl alcohol-type film having excellent polarizing ability, durability, heat resistance and moisture resistance and being free from warping, and a process for producing it.

Another object of this invention is to provide a process for producing a polarizing film which does not undergo tearing during production.

Still another object of this invention is to provide a process for producing a polarizing polyvinyl alcohol-type film by a simplified process with industrial advantage.

A further object of this invention is to provide a use of a polarizing film of practical utility.

Further objects of this invention will become apparent from the following description.

DETAILED DESCRIPTION OF INVENTION

Investigations of the present inventors have led to the discovery that the above objects of this invention are achieved by a polarizing film comprising a polyvinyl alcohol-type film and a dichroic dye, a metallic ion and boric acid incorporated therein, and a process comprising adsorbing a dichroic dye on a polyvinyl alcohol-type film, stretching the film substantially in one direction, immersing the stretched film in an aqueous solution containing a metallic ion and boric acid, and heat-treating the stretched film (to be referred to as "process A") [see the specification of Japanese Laid-Open Patent Publication No. 240905/1987 laid-open on Oct. 21, 1987].

Process A gives a polyvinyl alcohol-type film having excellent polarizing characteristics, durability, dimensional stability, heat resistance and moisture resistance.

On further investigations on the production of the polarizing film by process A, the present inventors have found that tearing sometimes occurs in the heat-treatment step of the process A.

On further investigations on the improvement of the process A, the present inventors have found a process for producing a polarizing film, which comprises adsorbing a dichroic dye on a polyvinyl alcohol film, immersing the film in an aqueous solution containing a metallic ion and boric acid to impregnate the metallic ion and boric acid in the film, substantially monoaxially stretching the film in the aqueous solution or in another liquid medium, and then heat-treating the stretched film under tension (to be referred to as process B).

Thus, the process B of the present invention provides a polarizing polyvinyl alcohol-type film having excellent polarizing ability, durability, heat resistance and moisture resistance, and an economically advantageous process for producing a polarizing film which is simplified and in which tearing does not occur in the film during production.

Moreover, the process of this invention has the following advantages over the conventional process for producing a polyvinyl alcohol-type polarizing film involving the adsorption of a dichroic dye.

The specification of the above-cited Japanese Laid-Open Patent Publication No. 95503/1984 describes a process for producing a polarizing film, which comprises dry hot-stretching a polyvinyl alcohol-type film dyed with a dichroic dye to impart polarizing ability to the film, heat-treating the film under tension at a temperature of at least 150° C., and thereafter treating the heat-treated film with boric acid. According to this process, the film is treated with boric acid after it has been subjected to the stretching treatment and the heat-treatment under tension. In contrast, in the present invention, the film is subjected to treatment with a metallic ion and boric acid, and then stretched and heat-treated under tension. By performing the boric acid treatment in the presence of a metallic ion, the polarizing ability and durability of the film increase over the case of performing it in the absence of the metallic ion in the above known method. The specification of the above-cited Japanese Laid-Open Patent Publication No. 95503/1984 does not describe nor suggest at all that after the treatment with the metallic ion and boric acid, the film is subjected to the stretching treatment and the heat-treatment under tension.

The specification of the above-cited Japanese Laid-Open Patent Publication No. 18902/1986 describes a process for producing a polarizing film, which comprises adsorbing a dichroic dye on a polymeric film (such as a polyvinyl alcohol film), orienting the film, and thereafter treating the film with an aqueous solution containing boric acid. In this process, the stretching treatment is carried out before the boric acid treatment. In contrast, the process of this invention involves treatment of the film with a metallic ion and boric acid, subjecting the film to the stretching treatment before or after the above treatment, and finally heat-treating the film under tension. The process gives a polarizing film having very superior polarizing ability and durability. The Japanese patent document neither describes nor suggests the carrying out of the boric acid treatment in the presence of the metallic ion, and the carrying out of the stretching treatment and the heat-treatment under tension after the boric acid treatment, and the advantages of this sequence of treatments.

The polyvinyl alcohol film used in this invention is a film of polyvinyl alcohol or its derivative. Specific examples of the film are a polyvinyl alcohol film, a polyvinyl formal film, a polyvinyl acetal film, and an ethylene/vinyl acetate copolymer film. The polyvinyl alcohol film is especially preferred. The polyvinyl alcohol-type film used in this invention may have a thickness usable as a polarizing film. Its suitable thickness is usually 30 to 150 microns, preferably 50 to 100 microns.

The dichroic dye used in this invention may be any dichroic dye which can be used to impart polarizing ability to the film. Usually, it is preferably any of those which are used for obtaining polarizing films from a polyvinyl alcohol-type film as a base. The dichroic dye may be a direct dye, a disperse dye or an acid dye. Examples of preferred dichroic dyes are Chrysophenine (C.I. No. 24895), Sirius Yellow (C.I. No. 29000), Benzopurpurine (C.I. No. 23500), Direct Fast Red (C.I. No. 23630), Chlorantine Fast Red (C.I. No. 28160), Brilliant Blue 6B (C.I. No. 24410), Chlorazol Fast Black BH (C.I. No. 22590), Direct Blue 2B (C.I. No. 22610), Direct Sky Blue (C.I. No. 24400), Diamine Green (C.I. No. 30295), Congo Red (C.I. No. 22120), Acid Black (C.I. No. 20470) and Primula Blue 6 GL.).

The processes A and B in this invention will be described below in detail.

Process A

It comprises adsorbing the dichroic dye on a polyvinyl alcohol-type film, stretching it substantially in one direction, immersing the stretched film in an aqueous solution containing a metallic ion and boric acid, and heat-treating the film under tension.

The dichroic dye may be adsorbed on the polyvinyl alcohol-type film by methods known per se. For example, it can be performed by immersing the polyvinyl alcohol-type film in an aqueous solution containing the dichroic dye at room temperature to 50° C.

The resulting unstretched film on which the dichroic dye is adsorbed is then dried and stretched substantially in one direction. The stretching in the process A is carried out in atmospheric air at a temperature of generally 60° C. to 140° C., preferably 70° C. to 120° C., at a stretch ratio of 2.5 to 8, preferably 3 to 6. If the stretch ratio is lower than 2.5, sufficient polarizing characteristics cannot be obtained, and moreover, "creases" tend to form in the film. If the stretch ratio exceeds 8, the film might be broken.

The film is stretched substantially monoaxially. This does not preclude some stretching carried out in another direction at right angles to the monoaxial direction in order to increase the film strength. The stretching in the other direction may be carried out simultaneously with the above monoxial stretching, or after the above monoaxial stretching. The stretch ratio in the other direction is preferably not more than one-half of that in the monoaxial direction. In the process A, the stretched and oriented film is then immersed in an aqueous solution containing a metallic ion and boric acid to impregnate the metallic ion and boric acid in the film.

Examples of the metallic ion used in the aqueous solution containing the metallic ion and boric acid (to be sometimes referred to as the "treating solution") preferably include ions of metals such as magnesium (Mg), calcium (Ca), chromium (Cr), manganese (Mn), iron (Fe), cobalt (Co), nickel (Ni), zirconium (Zr), copper (Cu), silver (Ag), tin (Sn), barium (Ba), aluminum (Al) and zinc (Zn). They may be used singly or in a mixture of two or more. Magnesium, calcium, manganese, iron, cobalt, nickel, zirconium, copper, silver, tin, barium, aluminum chromium and zinc are preferred as metals which give these metal ions.

Metal compounds used to give these metallic ions in the treating solution may include various water-soluble compounds, preferably inorganic or organic acid salts of the metals such as the hydrochlorides, sulfates, nitrates and acetates.

Advantageously, the treating solution for use in this invention is an aqueous solution containing the metallic ion and boric acid in suitable concentrations.

The suitable amounts of the metallic ion and boric acid to be impregnated in the film are 0.2 to 20 mg, preferably 1 to 5 mg, as the metal and 0.3 to 30 mg, preferably 1 to 10 mg, as boron, respectively, per gram of the film. To secure these amounts, it is preferred that the concentration of the metallic ion is 0.2 to 5 g/liter, as the metallic compound and the concentration of boric acid is 0.5 to 15 g/liter. Advantageously, the film is immersed in the treating solution usually at room temperature to 50° C. for 5 to 15 minutes.

The film so treated with the aqueous solution containing the metallic ion and boric acid heat-treated under tension. If desired, the film may be dried before the heat-treatment. Alternatively, the drying can be carried out at the same time as the heat-treatment.

The heat-treatment of the stretched film under tension is carried out at a temperature of at least 90° C., preferably 100 to 120° C., for 1 to 120 minutes, preferably 5 to 40 minutes.

Process B

The process B comprises adsorbing the dichroic dye on the polyvinyl alcohol-type film, immersing the film in an aqueous solution containing a metallic ion and boric acid, substantially monoaxially stretching the film in the aqueous solution or in another liquid medium, and heat-treating the stretched film under tension.

Adsorption of the dichroic dye may be carried out by the same procedure as in the process A described above.

In the process B, the unstretched film having the dichroic dye adsorbed thereon as in the process A is immersed in an aqueous solution containing a metallic ion to impregnate the metallic ion and boric acid in the film. The method of immersing the film in the treating aqueous solution, the conditions of immersion, and the reagents used therein in the process B are the same as in the process A, and a detailed description of these is omitted.

Thus, the process B is characterized in that the film immersed in the treating aqueous solution can be directly stretched substantially monoaxially in the same aqueous solution, or it may be substantially monoaxially stretched in a liquid medium. The process is simplified and is economically advantageous. Stretching the treated film directly in the same treating aqueous solution is very economical and industrially advantageous. When this stretching is to be carried out in the other liquid medium, water is preferably used as the medium.

The film stretching temperature is usually room temperature to 80° C., preferably room temperature to 50° C.

The film is stretched substantially monoaxially. This does not preclude some stretching carried out in another direction at right angles to the monoaxial direction in order to increase the film strength. The stretching in the other direction may be carried out simultaneously with the above monoaxial stretching, or after the above monoaxial stretching. The stretch ratio in the other direction is preferably not more than one-half of that in the monoaxial direction.

Preferably, the stretch ratio of the film is 2.5 to 8 times. If it is less than 2.5 times, the polarizing ability of the film is not sufficient, and creases tend to form in the film. If the stretch ratio exceeds 8 times, breakage may occur in the film.

The heat-treatment of the stretched film under tension is carried out at a temperature of at least 90° C., preferably 100° to 120° C., for 1 to 120 minutes, preferably 5 to 40 minutes.

The polarizing films obtained by processes A and B are of such a high quality that they have high heat resistance, moisture resistance and durability and very little tearing or creasing.

By laminating a polycarbonate film to both surfaces of the polarizing film, a polarizing film laminated structure having further improved moisture resistance can be obtained. The thickness of the polycarbonate film varies depending upon the use to which the resulting polarizing film is put. For use as an anti-glaring glass, its suitable thickness is 0.3 to 1 mm.

The polarizing film obtained by the present invention has excellent optical properties and high heat resistance and moisture resistance, and are useful in various applications including various optical instruments such as liquid crystal display devices; sunglasses, antiglaring glasses in goggles and shields, automobile windshield glasses, and windowpanes. It is particularly useful on vehicles in which it is frequently used at high temperatures and humidities.

According to the process of this invention, no film tearing occurs during the heat-treatment, and after dyeing, the film can be immersed directly in a treating aqueous solution containing a metallic ion and boric acid at room temperature to 50° C. without washing and drying. Since the film can be treated in the treating solution at room temperature to 50° C., the production process is drastically shortened, and is very economical.

The following examples illustrate the present invention in greater detail.

In these examples, the transmittance was measured by using a spectrophotometer (HITACHI330, a tradename for a product of Hitachi Limited). The single sheet transmittance, the parallel position transmittance ($H_o$: the light transmittance of an assembly of two films laid so that their molecular orientations are parallel to each other) and the perpendicularly crossing position transmittance ($H_{90}$: the transmittance of an assembly of two films laid so that their molecular orientations are perpendicular to each other) are values at the maximum absorption wavelength of the films when the films are color polarizing films, and are average values obtained by correcting luminosity factors in a visible region of 400 to 700 mm when the films are neutral polarizing films.

The degree of polarization was calculated from the following equation.

$$\text{Degree of polarization (\%)} = \sqrt{\frac{H_o - H_{90}}{H_o + H_{90}}} \times 100$$

The colors were measured by using a color difference meter (MC-1500MC, a tradename for a product of Tokyo Denshoku Co., Ltd.). In the measurement of the colors, the parallel position and the perpendicularly crossing position have the same meanings as in the measurement of the transmittances.

EXAMPLE A-1

A polyvinyl alcohol film (Kurare Vinylon 7500, a tradename for a product of Kuraray Inc.) or 15 minutes in an aqueous solution (dyeing solution) containing 0.33 g/liter of Congo Red, 1.87 g/liter of Brilliant Blue 6B and 0.56 g/liter of Direct Fast Yellow 5GL, washed with water and dried.

This film was stretched to four times monoaxially at a temperature of 95° to 100° C., and while it was maintained under tension, it was immersed for 5 minutes in an aqueous solution (treating solution) containing 3.38 g/liter of chromium nitrate nonhydrate and 6.64 g/liter of boric acid.

Thereafter, while it was maintained under tension, the treated film was washed with water and dried, and then heat-treated at 110° C. for 5 minutes. The film contained 1.22 mg of boron and 1.10 mg of chromium per gram thereof.

A 70 μm-thick polycarbonate film was laminated to both surfaces of the resulting film by using a urethane-type adhesive to give a neutral film having the properties indicated in Table 1.

The properties of the resulting laminated film were measured after it was exposed for 100 hours to an atmosphere kept at 100° C. (heat resistance test) and after it was exposed for 100 hours to an atmosphere kept at 80° C. and a relative humidity of 95% (moisture resistance test). The results are shown in Table 1.

EXAMPLE A-2

Example A-1 was repeated except that an aqueous solution containing 0.81 g/liter of Chlorantine Fast Red 5B, 1.85 g/liter of Brilliant Blue 6B and 0.81 g/liter of Chrysophenine was used as the dyeing solution, and an aqueous solution containing 3.30 g/liter of zinc acetate dihydrate and 6.57 g/liter of boric acid as the treating solution. The resulting film contained 1.30 mg of boron and 1.15 g of zinc per gram thereof. A 70 μm-thick polycarbonate film was bonded to both surfaces of the film using a urethane-type adhesive.

The laminated polarizing film obtained had the properties shown in Table 1.

COMPARATIVE EXAMPLE 1

The properties of a commercial neutral color polarizing film (obtained by adsorbing iodine on a polyvinyl alcohol-type film, orienting the film, and bonding a triacetyl cellulose film to it as a protective film) before and after it was exposed for 60 hours to an atmosphere kept at 100° C. (heat resistance test) were measured, and the results are shown in Table 1. The film considerably discolored within 60 hours.

When this film was exposed to an atmosphere kept at a temperature of 80° C. and a relative humidity of 80%, its color became lighter, and within 40 hours, the film became substantially transparent and showed no polarizing ability.

When this film was exposed to an atmosphere kept at a temperature of 80° C. and a relative humidity of 95%, its color became lighter, and within 20 hours, the film became substantially transparent and showed no polarizing ability.

COMPARATIVE EXAMPLE 2

Example A-1 was repeated except that an aqueous solution containing 6.23 g/liter of boric acid alone was used as the treating solution. The properties of the resulting film are shown in Table 1.

When this film was exposed for 100 hours to an atmosphere kept at 100° C., foaming occurred in the film.

COMPARATIVE EXAMPLE 3

Example A-2 was repeated except that the treatment of the film with the treating solution was not carried out. The properties of the resulting film are shown in Table 1.

When this film was exposed for 100 hours to an atmosphere kept at 100° C., foaming occurred in the film.

TABLE 1

| Test item | | Example A-1 Heat resistance test | Example A-1 Moisture resistance test | Example A-2 | Comparative Example 1 | Comparative Example 2 | Comparative Example 3 |
|---|---|---|---|---|---|---|---|
| Single sheet transmittance (%) | | 38.0 | 37.5 | 37.8 | 34.0 | 39.0 | 29.0 | 35.0 | 30.1 |
| Parallel position transmittance (%) | | 27.3 | 26.9 | 27.3 | 21.2 | 30.2 | 21.0 | 22.0 | 17.2 |
| Perpendicularly crossing position transmittance (%) | | 0.7 | 0.6 | 0.7 | 0.1 | 0 | 0 | 4.5 | 0.2 |
| Single sheet color | L | 61.07 | 60.82 | 60.93 | 57.52 | 60.46 | 50.26 | 58.57 | 54.18 |
| | a | −0.35 | −0.40 | −0.42 | 1.27 | −0.87 | 2.82 | 3.12 | 4.14 |
| | b | −0.17 | −0.07 | −0.38 | −4.23 | −0.02 | 21.46 | −6.34 | −5.35 |
| Parallel position color | L | 52.61 | 52.17 | 52.08 | 47.45 | 52.00 | 36.63 | 45.13 | 41.34 |
| | a | −1.06 | −1.11 | −1.01 | 0.92 | −27.13 | 8.20 | 3.56 | 4.81 |
| | b | 0.50 | 0.57 | 0.37 | −4.67 | 1.11 | 24.14 | −7.16 | −6.43 |
| Perpendicularly crossing position color | L | 0 | 0 | 0 | 0 | 0 | 0 | 11.49 | 0 |
| | a | 0 | 0 | 0 | 0 | 0 | 0 | 10.97 | 0 |
| | b | 0 | 0 | 0 | 0 | 0 | 0 | −17.30 | −0.72 |
| Degree of polarization (%) | | 97.5 | 97.8 | 97.5 | 99.5 | 100.0 | 100.0 | 81.3 | 98.8 |
| ΔL (*) | | 52.61 | 52.17 | 52.08 | 47.45 | 52.00 | 36.63 | 33.64 | 41.34 |

(*): ΔL = (parallel position L) − (perpendicularly crossing position L)

EXAMPLES A-3–A-14

In each run, Example A-2 was repeated using the same polyvinyl alcohol film as used in Example 1 except that an aqueous solution containing magnesium acetate, calcium acetate, manganese acetate, ferrous sulfate, cobalt chloride, zirconyl sulfate, copper (II) sulfate, silver nitrate, stannic chloride, barium sulfate or aluminum sulfate in each of the concentrations shown in Table 2 and boric acid in each of the concentrations shown in Table 2. In all runs, the resulting films had a ΔL of more than 46.

TABLE 2

| | Metal salt | | Boric | |
|---|---|---|---|---|
| Example | Type | Concentration (g/liter) | acid (g/liter) | Δ |
| A-3 | Magnesium acetate | 3.42 | 6.2 | 47.3 |
| A-4 | Calcium acetate | 3.84 | 6.9 | 46.4 |
| A-5 | Manganese acetate | 3.92 | 7.0 | 49.5 |
| A-6 | Ferrous sulfate | 3.88 | 6.1 | 48.6 |
| A-7 | Cobalt chloride | 3.72 | 7.0 | 50.1 |
| A-8 | Zirconyl sulfate | 3.48 | 6.0 | 46.2 |
| A-9 | Copper (II) sulfate | 3.22 | 7.0 | 46.7 |
| A-10 | Silver nitrate | 3.92 | 6.9 | 47.0 |
| A-11 | Stannic chloride | 3.70 | 6.8 | 47.8 |
| A-12 | Barium sulfate | 3.82 | 6.1 | 46.2 |
| A-13 | Aluminum sulfate | 3.04 | 6.1 | 46.3 |
| A-14 | Nickel acetate | 3.18 | 6.5 | 52.1 |

EXAMPLE A-15

Example A-1 was repeated except that an aqueous solution containing 1.91 g/liter of Direct Blue was used as the dyeing solution. A blue polarizing film was obtained. This film had a single sheet transmittance at 600 nm of 35.2% and a degree of polarization of 99.1%. It had the same heat resistance and moisture resistance as the film obtained in Example A-1.

COMPARATIVE EXAMPLE 4

Comparative Example 3 was repeated except that an aqueous solution containing 1.90 g/liter of Direct Blue was used as the dyeing solution. A blue polarizing film was obtained It had a single sheet transmittance at 600 nm of 27.0% and a degree of polarization of 98.0 %.

When this film was exposed for 100 hours to an atmosphere kept at 100° C., peeling occurred When it was exposed to an atmosphere kept at a temperature of 80° C. and a relative humidity of 80%, no foaming or peeling occurred, but after the lapse of 100 hours, its degree of polarization decreased to 88.0%.

EXAMPLE B-1

A polyvinyl alcohol film (Kurare Vinylon #7500, a tradename for a product of Kuraray Inc.) was dyed with an aqueous solution (dyeing solution) containing 0.40 g/liter of Chlorantine Fast Red, 0.30 g/liter of Brilliant Blue 6B, 0.30 g/liter of Direct Copper Blue 2B, 1.00 g/liter of Primula Blue 6GL and 0.30 g/liter of Chrysophenine at 35° C. for 8 minutes.

The dyed film was then immersed in an aqueous solution (treating solution) containing 0.30 g/liter of nickel acetate tetrahydrate and 12.2 g/liter of boric acid at room temperature for 10 minutes, and stretched monoaxially to 5 times in the same solution.

The stretched film was taken out from the solution, and while being maintained under tension, washed with water and dried. It was then heat-treated at 110° C. for 10 minutes.

The resulting film contained 1.80 mg of boron and 1.04 mg of nickel per gram thereof.

A 70 μm-thick polycarbonate film was laminated to both surfaces of the resulting film by using a urethane-type adhesive to give a neutral film having the properties indicated in Table 3.

The properties of the resulting laminated film were measured after it was exposed to an atmosphere kept at 100° C. for 1000 hours (heat resistance test) and after it was exposed to an atmosphere kept at 80° C. and a relative humidity of 95% for 1000 hours (moisture resistance test). The results are shown in Table 3.

EXAMPLE B-2

The same polyvinyl alcohol film as used in Example B-1 was dyed with the same dyeing solution as used in Example 1 under the same conditions as in Example B-1. The dyed film was then worked up as in Example B-1 except that an aqueous solution containing 1.20 g/liter of cobalt acetate tetrahydrate and 18.0 g/liter of boric acid was used as the treating solution.

The properties of the resulting film are shown in Table 3.

TABLE 3

| Test item | | Example 1 Before the heat resistance and moisture resistance test | After the heat resistance test | After the moisture resistance test | Example 2 |
|---|---|---|---|---|---|
| Single sheet transmittance (%) | | 38.9 | 37.8 | 40.4 | 37.2 |
| Parallel position transmittance (%) | | 29.8 | 29.0 | 31.2 | 27.5 |
| Perpendicularly crossing position transmittance (%) | | 0.7 | 0.7 | 0.8 | 0.4 |
| Single sheet color | L | 62.46 | 61.58 | 64.07 | 60.97 |
| | a | −2.19 | −2.08 | −3.02 | −1.99 |
| | b | 4.81 | 5.02 | 5.16 | 1.04 |
| Parallel position color | L | 54.20 | 53.15 | 55.34 | 51.49 |
| | a | −2.19 | −2.08 | −4.07 | −2.60 |
| | b | 4.81 | 5.31 | 5.52 | 3.05 |
| Perpendicularly crossing position color | L | 0 | 0 | 0 | 0 |
| | a | 0 | 0 | 0 | 0 |
| | b | 0 | 0 | 0 | 0 |
| Degree of polarization (%) | | 97.7 | 97.6 | 97.5 | 98.6 |
| ΔL | | 54.20 | 53.15 | 55.34 | 51.49 |

EXAMPLES B-3–B-15

In each run, Example B-2 was repeated using the same polyvinyl alcohol film a used in Example B-1 except that an aqueous solution containing magnesium acetate, calcium acetate, manganese acetate, ferrous sulfate, cobalt chloride, zirconyl sulfate, copper (II) sulfate, silver nitrate, stannic chloride, barium sulfate or aluminum sulfate in each of the concentrations shown in Table 4 and boric acid in each of the concentrations shown in Table 4. In all runs, the resulting films had a ΔL of more than 48.

TABLE 4

| | Metal salt | | Boric | |
|---|---|---|---|---|
| Example | Type | Concentration (g/liter) | acid (g/liter) | ΔL |
| B-3 | Magnesium acetate | 0.57 | 12.3 | 49.3 |
| B-4 | Calcium acetate | 0.64 | 13.8 | 48.2 |
| B-5 | Manganese acetate | 1.32 | 16.2 | 51.2 |
| B-6 | Ferrous sulfate | 0.98 | 11.6 | 50.6 |
| B-7 | Cobalt chloride | 1.12 | 19.3 | 52.2 |
| B-8 | Zirconyl sulfate | 0.58 | 11.9 | 48.3 |
| B-9 | Copper (II) sulfate | 0.37 | 15.3 | 48.7 |
| B-10 | Silver nitrate | 0.82 | 15.6 | 49.3 |
| B-11 | Stannic chloride | 0.95 | 13.5 | 49.6 |
| B-12 | Barium sulfate | 0.47 | 11.6 | 48.6 |
| B-13 | Aluminum sulfate | 0.34 | 14.7 | 48.7 |
| B-14 | Chromium nitrate | 0.60 | 12.2 | 53.1 |
| B-15 | Zinc acetate | 0.89 | 12.2 | 52.4 |

EXAMPLE B-16

Example B-1 was repeated except that the dyeing of the film was carried out at 40° C. for 15 minutes by using an aqueous solution containing 0.81 g/liter of Chlorantine Fast Red. A red polarizing film was obtained The resulting film had a single sheet transmittance at 510 nm of 40.5 % and a degree of polarization of 98.7%. After it was subjected to the same heat resistance test and moisture resistance test as in Example B-1, no change in color was observed The variation in the single sheet transmittance was less than 2.0 %, and the variation in the degree of polarization was less than 1.0 %.

COMPARATIVE EXAMPLE 5

Example B-16 was repeated except that the an aqueous solution containing only boric acid in a concentration of 12.5 g/liter was used as the treating solution.

The resulting film had a single sheet transmitance at 510 nm of 40.2%, and a degree of polarization of 87.4%. Thus, the polarizing ability of the film was inferior to that of the film obtained in Example B-16.

When this film was exposed for 300 hours to an atmosphere kept at 100° C., its single sheet transmittance decreased to 34.8%, and a marked discoloration was observed.

COMPARATIVE EXAMPLE 6

Example B-1 was repeated except that deionized water was used as the treating solution.

The resulting film had a single sheet transmittance in the visible region of 39.0% and a degree of polarization of 78.7%. Thus, its polarizing ability was much inferior to that of the film obtained in Example B-1.

What we claim is:

1. A process for producing a polarizing film, which comprises adsorbing a dichroic dye on a polyvinyl alcohol-type film, subsequently stretching the film substantially in one direction, immersing the stretched film in an aqueous solution containing a metallic ion and boric acid, and subsequently heat treating the stretched film under tension.

2. The process of claim 1 wherein the metallic ion is on ion of at least one metal selected from the group consisting of magnesium, calcium, chromium, manganese, iron, cobalt, nickel, zirconium, copper, silver, tin, barium, aluminum and zinc.

3. The process of claim 1 wherein the amount of the metallic ion impregnated in the polarizing film is 0.2 to 20 mg as the metal per gram of the film.

4. The process of claim 1 wherein the amount of boric acid impregnated in the polarizing film is 0.3 to 30 mg as boron per gram of the film.

5. The process of claim 1 wherein the stretching is carried out at a stretch ratio of 2.5 to 8.

6. A process for producing a polarizing film, which comprises adsorbing a dichroic dye on a polyvinyl alcohol film, subsequently immersing the film in an aqueous solution containing a metallic ion and boric acid to impregnate the metallic ion and boric acid in the film, subsequently monoaxially stretching the film in the aqueous solution or in another liquid medium, and then subsequently heat-treating the stretched film under tension.

7. The process of claim 6 wherein the metallic ion is an ion of at least one metal selected from the group consisting of magnesium, calcium, chromium, manganese, iron, cobalt, nickel, zirconium, copper, silver, tin, barium, aluminum and zinc.

8. The process of claim 6 wherein the amount of the metallic ion impregnated in the polarizing film is 0.2 to 20 mg as the metal per gram of the film.

9. The process of claim 6 wherein the amount of boric acid impregnated in the polarizing film is 0.3 to 30 mg as boron per gram of the film.

10. The process of claim 6 wherein the stretching is carried out at a stretch ratio of 2.5 to 8.

* * * * *